United States Patent
Mallik et al.

(10) Patent No.: US 12,332,477 B2
(45) Date of Patent: Jun. 17, 2025

(54) METHODS AND APPARATUS TO REDUCE STRESS ON LASERS IN OPTICAL TRANSCEIVERS

(71) Applicant: Intel Corporation, Santa Clara, CA (US)

(72) Inventors: Aditi Mallik, Cupertino, CA (US);
Pengyue Wen, San Jose, CA (US);
Quan Tran, Fremont, CA (US);
Wendai Wang, Dublin, CA (US);
Xiaozhong Wang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 17/474,938

(22) Filed: Sep. 14, 2021

(65) Prior Publication Data

US 2023/0083610 A1  Mar. 16, 2023

(51) Int. Cl.
*G02B 6/12* (2006.01)
*H04B 10/40* (2013.01)

(52) U.S. Cl.
CPC .............. *G02B 6/12* (2013.01); *H04B 10/40* (2013.01)

(58) Field of Classification Search
CPC ........ G02B 6/12; G02B 6/4201; H04B 10/40; H04B 10/801
USPC .......................................................... 398/135
See application file for complete search history.

(56) References Cited

U.S. PATENT DOCUMENTS

| | | | |
|---|---|---|---|
| 6,685,498 B1 * | 2/2004 | Jones ................. | H01R 11/18 324/755.05 |
| 10,050,383 B2 * | 8/2018 | O'Young .......... | H01R 13/6581 |
| 11,775,119 B1 * | 10/2023 | Song ................ | H01L 25/0655 361/749 |
| 2002/0079572 A1 * | 6/2002 | Khan ................ | H01L 23/3677 257/E23.092 |
| 2003/0000736 A1 * | 1/2003 | Sathe ............... | H01L 23/562 257/E23.068 |
| 2003/0111726 A1 * | 6/2003 | Khan ................ | H01L 23/13 257/E23.079 |
| 2003/0146511 A1 * | 8/2003 | Zhao ................ | H01L 23/49822 257/E23.105 |
| 2006/0255442 A1 * | 11/2006 | Gaynes ............. | H05K 1/0271 257/E23.194 |
| 2014/0211415 A1 * | 7/2014 | Degner ............. | H01L 23/4006 361/679.54 |
| 2020/0121046 A1 * | 4/2020 | Buechin ........... | A45C 11/00 |
| 2020/0133046 A1 * | 4/2020 | Goyal ............... | G02B 6/0083 |
| 2021/0059586 A1 * | 3/2021 | Marriott ........... | A61B 5/7225 |
| 2021/0264821 A1 * | 8/2021 | Seo .................. | G09F 9/301 |
| 2024/0184067 A1 * | 6/2024 | Bockstaele ....... | G02B 6/4272 |

FOREIGN PATENT DOCUMENTS

FR  2781604 A1 *  1/2000  ........... H01L 21/563

* cited by examiner

*Primary Examiner* — Abbas H Alagheband
(74) *Attorney, Agent, or Firm* — Hanley, Flight & Zimmerman, LLC

(57) ABSTRACT

Methods and apparatus to reduce stress on lasers in optical transceivers are disclosed. An apparatus comprising a printed circuit board (PCB) having a first side and a second side opposite the first side; and a first stiffener attached to the first side of the PCB; and a photonic integrated circuit (PIC) attached to the first stiffener. The first stiffener is between the PIC and the PCB. The apparatus also includes a second stiffener attached to the second side of the PCB.

25 Claims, 3 Drawing Sheets

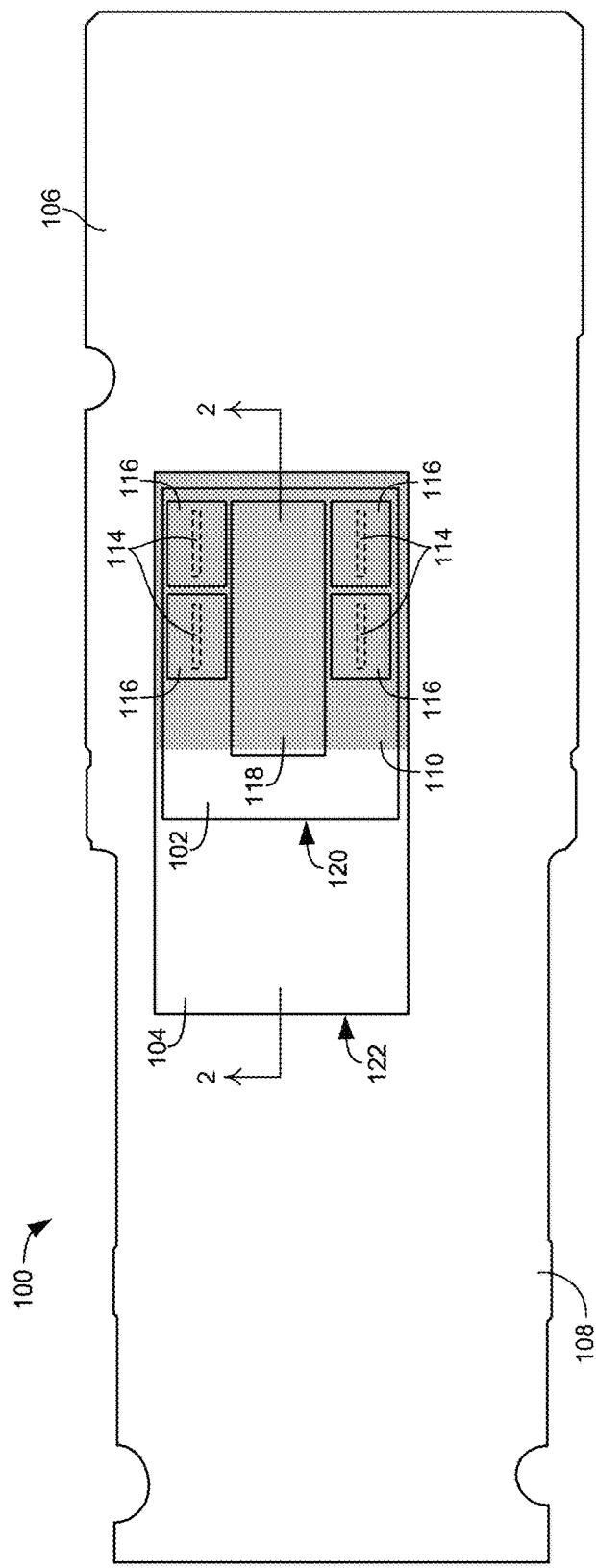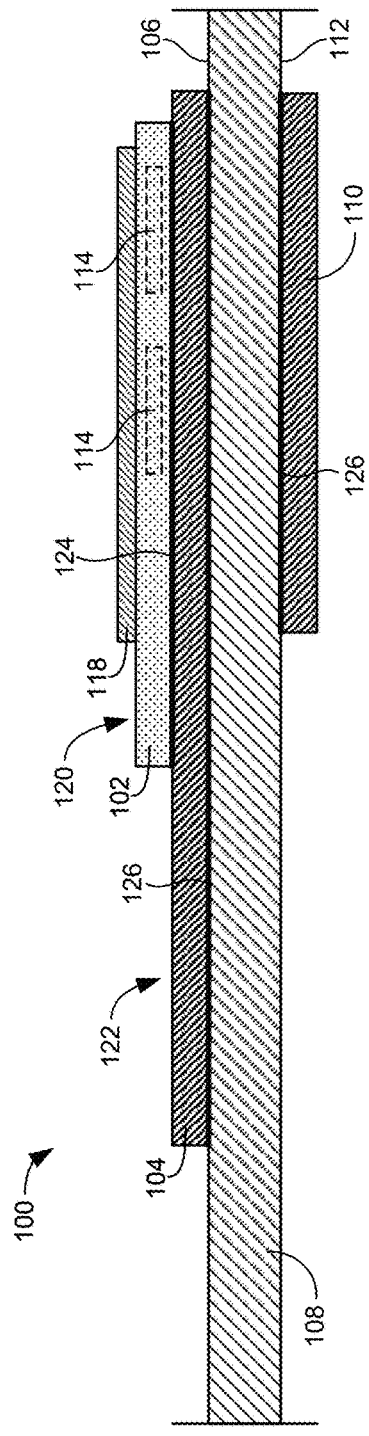

METHODS AND APPARATUS TO REDUCE STRESS ON LASERS IN OPTICAL TRANSCEIVERS

FIELD OF THE DISCLOSURE

This disclosure relates generally to optical interconnects and, more particularly, to methods and apparatus to reduce stress on lasers in optical transceivers.

BACKGROUND

Interconnects facilitate the transfer of data signals between two or more components. As demand for high data rate signaling increases, many electrical interconnects cannot keep up with the energy efficiency requirements for sustained bandwidths. Accordingly, optical interconnects are being explored as a viable alternative.

BRIEF DESCRIPTION OF THE DRAWINGS

FIG. 1 is a top view of a portion of an example optical transceiver assembly that includes an example photonics integrated circuit (PIC) package mounted on a printed circuit board (PCB) in accordance with teachings disclosed herein FIG. 2 is a cross-sectional view of the portion of the example optical transceiver assembly of FIG. 1 taken along the line 2-2 of FIG. 1

Figure 3:
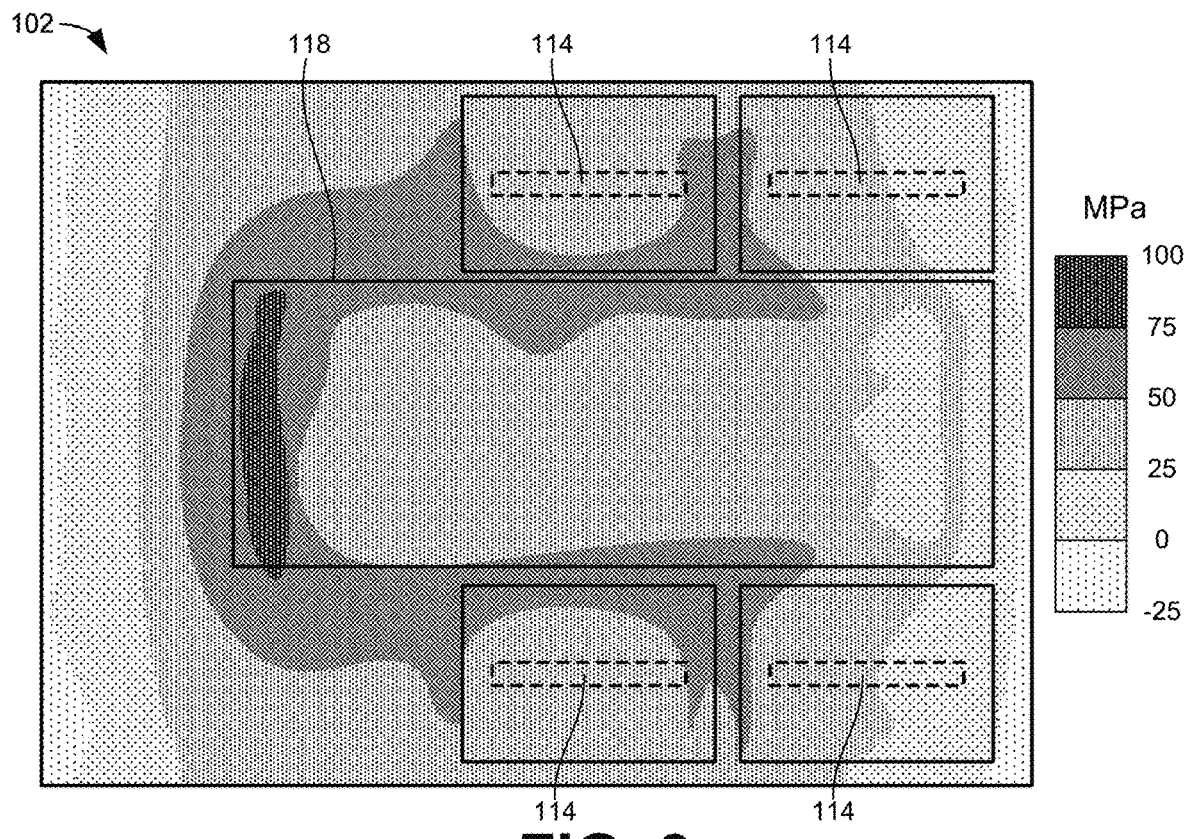
FIG. 3 illustrates simulated stress levels across the example PIC of FIGS. 1 and 2 in a scenario where the PIC is mounted to a stiffener on a first side of a printed circuit board (PCB) and no stiffener is attached to an opposite side of the PCB.

The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Optical transceivers, which operate using lasers, are often employed as optical interconnects between components in situations where high-bandwidth communications are needed (e.g., in data centers, server farms, etc.). While optical transceivers enable high bandwidth communications, their reliability can be significantly compromised when subjected to thermomechanical stresses and/or stress gradients. Even a small laser defect caused by thermomechanical stress can develop into a network of defects that ultimately lead to a catastrophic laser failure. The likelihood of laser defects and/or failures increases when optical transceivers are operated for extend periods of time, particularly at elevated temperatures. Furthermore, the likelihood of laser defects and/or failures increases as the laser count or channel count for a given optical transceiver increases.

In many instances, an optical transceiver is implemented using a photonic integrated circuit (PIC) that is mounted to a printed circuit board (PCB). PCBs often have a thickness of approximately 1 mm and a coefficient of thermal expansion (CTE) of approximately 15-17 ppm/° C. By contrast, PICs can be significantly thinner and smaller and have a much lower CTE than PCBs. For instance, PICs can have a thickness of approximately 0.5 mm (and a much smaller footprint than the underlying PCB) with a CTE of approximately 2.5 ppm/° C. The much larger size and higher CTE of a PCB results in the PCB producing thermomechanical stresses in a PIC that can deleteriously affect the reliability of the lasers included in the PIC.

Past efforts at mitigating against thermomechanical stresses on lasers in a PIC mounted on a PCB have involved the use of a ceramic (e.g., aluminum nitride (AlN)) stiffener, slug, or insert embedded within the PCB. Thus, rather than mounting a PIC directly onto a surface of a PCB, the PIC is mounted onto the surface of the ceramic insert embedded in the PCB. Such a ceramic insert is stiff and, therefore, able to resist external mechanical stress (e.g., warpage in the PCB). Furthermore, a ceramic insert has a CTE that is relatively close to the silicon wafer material used to fabricate PICs such that there will be less stress on the lasers due to thermal fluctuations. A downside to using an embedded ceramic insert is that the ceramic insert takes up space within the PCB, thereby preventing the use of that space for signal routing. The ever-increasing demand for more functionality at higher data throughput in smaller formfactors has rendered ceramic inserts embedded in a PCB an alternative that is no longer viable.

Another potential solution that does not use up any space within the PCB is to attach a ceramic stiffener onto the surface of the PCB and then to mount the PIC on the stiffener. While this frees up the interior of the PCB for other uses, this approach creates new potential sources of thermomechanical stress. In particular, the stiffener may not be much bigger than the PIC such that the PCB is significantly larger than both the PIC and the stiffener (both in terms of thickness as well as overall footprint). Furthermore, as discussed above, the PCB has a significantly higher CTE than either the PIC or the stiffener (both of which have similar CTEs). The much larger size and higher CTE of the PCB results in the PCB dominating the overall behavior of the package in response to thermal fluctuations (e.g., when the package cools down after assembly and/or when it is heated during operation and subsequently cooled). The significant thermal expansion and/or contraction of the PCB relative to the stiffener in the above proposed solution is particularly problematic because the stiffener is attached to one side (e.g., a top side) of the PCB while the opposite (e.g., bottom) side of the PCB is free from any components. This offset positioning of the stiffener relative to the PCB can result in warpage of the PCB, thereby leading to excessive mechanical stress in the PCB and the stiffener. This stress can, in turn, be transferred to the PIC to induce defects in the laser. In short, adding a stiffener to the external side of the PCB can potentially create stress on the PIC contrary to the intended purpose of attaching the stiffener in the first place.

Examples disclosed herein significantly reduce the amount of thermomechanical stress transferred to a PIC that is mounted onto a stiffener attached to a first side of a PCB by including a separate stiffener attached to a second side of the PCB opposite the first stiffener. In particular, FIG. 1 is a top view of an example optical transceiver assembly 100 constructed in accordance with teachings disclosed herein. FIG. 2 is a cross-sectional view of the optical transceiver assembly 100 of FIG. 1 taken along the line 2-2 of FIG. 1. As shown in the illustrated example, the package 100 includes a PIC 102 mounted on a first stiffener 104 that is itself mounted onto a first side or surface (e.g., a top side or top surface) 106 of a PCB 108. The first stiffener 104 functions as an optical bench for the PIC 102 that provides a stiff surface that can resist thermomechanical stress produced by the PCB 108. Thus, the first stiffener 104 is a first means for reducing stress in the PIC 102. Additionally, a second stiffener 110 is mounted to a second side or surface (e.g., a bottom or back side or surface) 112 of the PCB 108 to provide additional stiffness that mitigates against warpage in the PCB 108 that would otherwise occur if the second side 112 of the PCB 108 were left free and uncovered. Thus, the second stiffener 110 is a second means for reducing stress in the PIC 102. Although the second stiffener 110 is not visible in FIG. 1 (because it is on the other side of the PCB 108 from what is shown), for purposes of explanation, the size and position of the second stiffener 110 is represented by the shaded area in FIG. 1. In some examples, both the first and second stiffeners 104, 110 are ceramic (e.g., AlN).

As shown in the illustrated example, the PIC 102 implements an optical transceiver that includes four laser channels 114 (represented by dashed lines) corresponding to the location of lasers within the PIC 102. In other examples, the PIC 102 may include additional laser channels 114 or fewer laser channels 114 than the four shown. Furthermore, the laser channels 114 need not be positioned or arranged as shown but can be at any location within the PIC. Notably, however, the locations of the four laser channels 114 are the locations of the PIC 102 that are susceptible to laser defects that can result from thermomechanical stresses. Accordingly, the locations of the laser channels 114 and the immediate vicinity of the laser channels (however distributed in the PIC 102) are of primary concern in reducing thermal and/or mechanical stress. Thus, as shown in FIG. 1, four dummy dies 116 are mounted on the surface of the PIC 102 opposite the stiffener 104 so as to be above the four laser channels 114. The dummy dies 116 facilitate the extraction and/or dissipation of heat from the PIC 102 at the corresponding locations of the laser channels 114. In this example, a flip chip 118 is also mounted onto the surface of the PIC 102 opposite the first stiffener 104. In some examples, the dummy dies 116 and/or the flip chip 118 may be omitted.

In some examples, both of the stiffeners 104, 110 are made of the same ceramic material such as aluminum nitride (AlN). As noted above, AlN has a similar CTE to silicon, which is used in the fabrication of the PIC 102, such that each of the PIC 102, the first stiffener 104, and the second stiffener 110 have corresponding CTEs. As shown in the illustrated example, both of the stiffeners 104, 110 have similar thicknesses. In this example, the stiffeners 104, 110 have a thickness of approximately 0.5 mm, which is the same thickness as the PIC 102. By contrast, the PCB 108 has a thickness of approximately 1 mm.

As shown in the illustrated example, both the first and second stiffeners 104, 110 are dimensioned to cover an area sufficiently large to encompass the locations of the laser channels 114. That is both of the stiffeners 104, 110 are larger than an area that circumscribes all of the laser channels 114. Furthermore, as shown in FIGS. 1 and 2, both the first and second stiffeners 104, 110 are arranged in stacked alignment with one another and with the PIC 102. More particularly, the stiffeners 104, 110 are arranged in stacked alignment with the laser channels 114 of the PIC 102. That is, if an image of the laser channels 114 and an image of the stiffeners 104, 110 were projected onto the surface 106 of the PCB 108 in a direction normal to the surface 106, a perimeter of each of the projections of the stiffeners 104, 110 would completely surround or enclose the projection of the laser channels 114. While this is true of the laser channels themselves, it may not be true of the entire PIC 102. In particular, as shown in the illustrated example, an end 120 of the PIC 102 extends beyond and is not in stacked alignment with the second stiffener 110. However, this end 120 of the PIC 102 does not contain the laser channels 114 and is spaced apart from them such that there is no need for the stiffener 110 to extend that far to provide the mechanical stiffness intended to protect the laser channels 114 from stress. In other examples, the second stiffener 110 may be larger than the PIC 102 such that every portion of the PIC 102 is in stacked alignment with the second stiffener 110.

As shown in the illustrated example, the first stiffener 104 is significantly larger than the PIC 102 with a portion 122 of the first stiffener 104 extending beyond the PIC 102 to be exposed to the external environment. In some examples, the exposed portion 122 of the first stiffener 104 helps the first stiffener function as a heat spreader to extract and dissipate heat from the PIC 102. In some examples, the exposed portion 122 may be removed such that the first stiffener 104 is approximately the same size as the PIC 102. In some examples, the first and second stiffeners 104, 110 are the same size so that an entirety of their perimeters are in alignment on either side of the PCB 108. In other examples, where the first and second stiffeners 104, 110 are different sizes, at least a portion of the perimeters of the first and second stiffeners 104, 110 are in alignment on either side of the PCB 108. More particularly, in some examples the portion of the perimeters that are in alignment can be a relatively significant proportion of the perimeters (e.g., at least one full edge of at least one of the stiffeners 104, 110, at least two full edges of at least one of the stiffeners 104, 110, at least three full edges of at least one of the stiffeners 104, 110, more than half of the full perimeter of at least one of the stiffeners 104, 110, etc.). Establishing alignment of some or all of the perimeter of each of the stiffeners 104, 110 provides symmetry of structural support on either side of the PCB 104 to reduce warpage of the PCB 104 within the area of alignment between the stiffeners 104, 110 (e.g., corresponding to the area where the laser channels 114 are located).

While the second stiffener 110 can be smaller than the PIC 102 (as described above), the first stiffener 104 needs to be at least the size of the PIC 102 to enable the PIC 102 to be mounted thereon. In some examples, the PIC 102 is mounted or attached to the first stiffener 104 using a soft epoxy 124 that has a relatively low modulus of elasticity to reduce the effects of minor variations in the CTE between the PIC 102 and the first stiffener 104. By contrast, the stiffeners 104, 110 are attached to the PCB 108 using a standard die attach epoxy 126 that has a much higher modulus of elasticity to provide a more rigid connection between the stiffeners 104, 110 and the PCB 108 so as to restrict warpage of the PCB 108 in the area aligned with the PIC 102 and, more particularly, the laser channels 114 within the PIC 102.

Simulation has shown a reduction in stress on the lasers associated with the laser channels 114 of the PIC 102 through the use of the two stiffeners 104, 110 of more than 80% when compared with a single stiffener placed on one side of the PCB 108. This significant reduction in the stress experienced by the laser channels 114 results in significant improvements in the reliability and service life of the PIC 102. Indeed, experimental testing of different PICS mounted on the first stiffener 104 both with and without the second stiffener 110 attached to the back side of the PCB 108 has shown that the packages without the second stiffener 104 failed much sooner than when the PICS were attached to the PCB 108 with the second stiffener 104 included on the back side.

Figure 4:
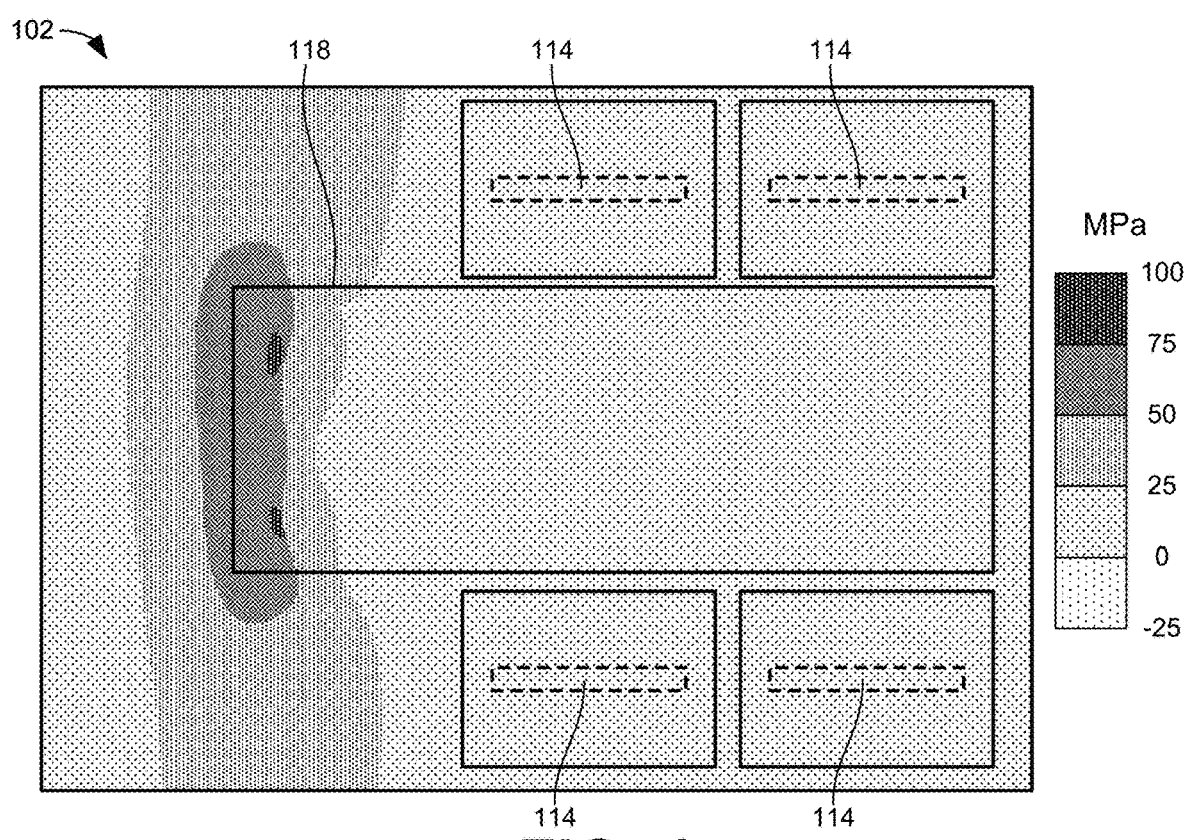
FIG. 4 illustrates simulated stress levels across the PIC of FIGS. 1 and 2 in a scenario where the PIC is mounted as shown in FIGS. 1 and 2 with two separate stiffeners on either side of the PCB.

In addition to the overall reduction in the amount of stress to which the laser channels 114 are subjected based on the implementation of teachings disclosed herein, simulations have also shown a significant reduction in the stress gradient or variability of stress along the laser channels 114, which is another significant factor leading to laser defects and/or failures. In particular, FIG. 3 illustrates simulated stress levels across the PIC 102 of FIG. 1 in a scenario where the PIC 102 is mounted to a stiffener on a first side of a PCB and no stiffener is attached to the other side of the PCB. By contrast, FIG. 4 illustrates the simulated stress across the PIC 102 in a scenario where the PIC 102 is mounted as shown in FIGS. 1 and 2 with two separate stiffeners 104, 110 on either side of a PCB. In the illustrated examples, the different shadings represent different 25 MPa ranges of stress with the darker shaded areas indicative of higher amounts of stress. Thus, as shown in the illustrated examples, the location of the highest amounts of stress in both scenarios is located near the end of the flip chip 118. However, the higher levels of stress extend across a much wider area of the PIC 102 shown in FIG. 3 (corresponding to a package that does not include the second stiffener 110) than the PIC 102 shown in FIG. 4 (corresponding to a package that includes the second stiffener 110 as shown in FIGS. 1 and 2).

Furthermore, as shown in FIG. 3, multiple different shadings corresponding to different amounts of stress are in the vicinity of the laser channels 114, thereby indicating relatively high stress gradients in the vicinity of the laser channels 114. Indeed, as shown in FIG. 3, a boundary between the 0-25 MPa stress level and the 25-50 MPa stress level extends through the middle of the rightmost laser channels 114 indicating a relatively high stress gradient along the length of the laser channels 114. Even though the overall levels of stress in the rightmost laser channels 114 are lower than in the leftmost laser channels 114, testing has revealed that the rightmost laser channels 114 failed (e.g., developed dark line defects) even before the leftmost laser channels 114. Such early failures are attributable to the high stress gradients along the length of the laser channels 114 that can change the grating spacing in the channels in a non-uniform manner, which leads to optical failures.

In contrast with the simulated stress distribution shown in the illustrated example of FIG. 3, the amount of stress in the region of the laser channels 114 shown in FIG. 4 is not only lower but remains relatively constant across the entire area associated with the laser channels 114 and the surrounding vicinity. As a result, the laser channels 114 in the illustrated example of FIG. 4 (associated with a package that includes the second stiffener 110) experience a much lower stress gradient than in the example shown in FIG. 3. More particularly, simulations indicate the stress gradient across the laser channels 114 shown in FIG. 4 is approximately 85% lower than the simulated stress gradient across the corresponding laser channel 114 shown in FIG. 3.

Figure 5:
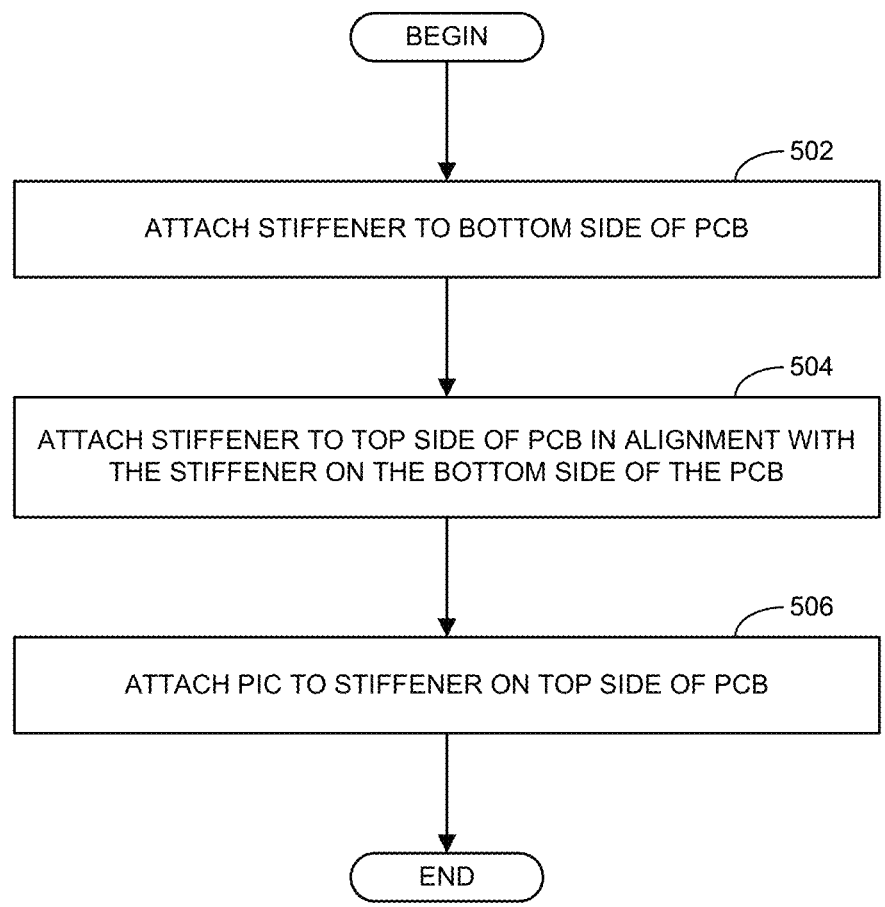
FIG. 5 is a flowchart representative of an example method of assembly of the example optical transceiver assembly of FIGS. 1 and 2.

FIG. 5 is a flowchart representative of an example method of assembling the example optical transceiver assembly 100 of FIGS. 1 and 2. In some examples, the some or all of the operations outlined in the example method are performed automatically by fabrication equipment that is programmed to perform the operations. Although the example method of assembly is described with reference to the flowchart illustrated in FIG. 5, many other methods may alternatively be used. For example, the order of execution of the blocks may be changed, and/or some of the blocks described may be combined, divided, re-arranged, omitted, eliminated, and/or implemented in any other way.

The example process begins at block 502 by attaching a stiffener (e.g., the second stiffener 110) to a bottom side (e.g., the bottom side 112) of a PCB (e.g., the PCB 108). At block 504, the method includes attaching a stiffener (e.g., the first stiffener 104) to a top side (e.g., the top side 106) of the PCB 108 in alignment with the stiffener 110 on the bottom side 112 of the PCB 108. At block 506, the method includes attaching a PIC (e.g., the PIC 102) to the stiffener 104 on the top side 106 of the PCB 108. In this example, the bottom side stiffener 110 is added first to provide structural support to the PCB 108 prior to the attachment of the top side stiffener 104 to reduce warpage in the PCB 108 when the top side stiffener 104 is added. As a result, the amount of stress induced on the top side stiffener 104 will be reduced, thereby reducing the amount of stress transferred to the PIC 102.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that enable the fabrication of optical transceivers with much higher reliability over extended periods of time that presently known optical transceivers. More particularly, increased reliability is achieved by significant reductions in both the overall stresses experienced by laser channels in the optical transceivers and also the stress gradient or variation of stress along the laser channels. These reductions are made possible by include two separate stiffeners in the optical transceiver assembly. A first stiffener is attached to a first side of the PCB and supports the PIC. The second stiffener is attached to the second side of the PCB opposite the first side.

Example 1 includes an apparatus comprising a printed circuit board (PCB) having a first side and a second side opposite the first side, a first stiffener attached to the first side of the PCB, a photonic integrated circuit (PIC) attached to the first stiffener, the first stiffener between the PIC and the PCB, and a second stiffener attached to the second side of the PCB.

Example 2 includes the apparatus of example 1, wherein the second stiffener is in alignment with the first stiffener and the PIC.

Example 3 includes the apparatus of any one of examples 1 or 2, wherein a full length of an edge of the second stiffener is in alignment with an edge of the first stiffener in a direction normal to the first side of the PCB.

Example 4 includes the apparatus of any one of examples 1-3, wherein more than half of a full perimeter of the second stiffener is in alignment with a perimeter of the first stiffener in a direction normal to the first side of the PCB.

Example 5 includes the apparatus of any one of examples 1-4, wherein the second stiffener has a same thickness as the first stiffener.

Example 6 includes the apparatus of any one of examples 1-5, wherein the second stiffener is a same size as the first stiffener.

Example 7 includes the apparatus of any one of examples 1-5, wherein the second stiffener is smaller than the PIC.

Example 8 includes the apparatus of example 7, wherein the PIC includes one or more laser channels, the one or more laser channels circumscribed by a first area, the second stiffener larger than the first area.

Example 9 includes the apparatus of any one of examples 1-8, wherein the first and second stiffeners are ceramic stiffeners.

Example 10 includes the apparatus of any one of examples 1-9, wherein the first stiffener is attached to the PCB with a first epoxy and the PIC is attached to the first stiffener with a second epoxy, the second epoxy different than the first epoxy.

Example 11 includes the apparatus of example 10, wherein the first epoxy has a higher modulus of elasticity than the second epoxy.

Example 12 includes an optical transceiver assembly comprising a photonic integrated circuit (PIC), a first means for reducing stress in the PIC, the first stress reducing means to couple the PIC to a printed circuit board (PCB), and a second means for reducing stress in the PIC, the first and second stress reducing means attached to opposite sides of the PCB.

Example 13 includes the optical transceiver assembly of example 12, wherein the PIC is in stacked alignment with both the first and second stress reducing means.

Example 14 includes the optical transceiver assembly of any one of examples 12 or 13, wherein the first stress reducing means covers a first area of the PCB, and the second stress reducing means covers a second area of the PCB.

Example 15 includes the optical transceiver assembly of example 14, wherein at least a portion of a perimeter of the second area is aligned with a perimeter of the first area in a direction normal to the opposite sides of the PCB.

Example 16 includes the optical transceiver assembly of any one of examples 14 or 15, wherein the second area is smaller than the area.

Example 17 includes the optical transceiver assembly of example 14, wherein the PIC includes one or more laser channels, and the second stress reducing means is positioned such that a perimeter of a projection of the second area onto to the PCB would completely surround a projection of the one or more laser channels.

Example 18 includes the optical transceiver assembly of any one of examples 12-17, wherein the second stress reducing means is attached to the PCB with a first epoxy and the PIC is attached to the first stress reducing means with a second epoxy, the second epoxy different than the first epoxy.

Example 19 includes the optical transceiver assembly of example 18, wherein the first epoxy has a higher modulus of elasticity than the second epoxy.

Example 20 includes a method of assembling an optical transceiver assembly, the method comprising attaching a first stiffener to a first side of a printed circuit board (PCB), attaching a second stiffener to a second side of the PCB, the first stiffener opposite the second stiffener, and attaching a photonic integrated circuit (PIC) to the first stiffener.

Example 21 includes the method of example 20, wherein the second stiffener is attached to the PCB before the first stiffener is attached to the PCB.

Example 22 includes the method of example 21, wherein the first stiffener is attached to the PCB before the PIC is attached to the first stiffener.

Example 23 includes the method of any one of examples 20-22, wherein the first stiffener is attached to the PCB using a first epoxy and the PIC is attached to the first stiffener using a second epoxy, the second epoxy having a lower modulus of elasticity than the second epoxy.

Example 24 includes the method of any one of examples 20-23, wherein the PIC includes one or more laser channels, and the second stiffener is sized and positioned to align, in a direction normal to a mounting surface of the PCB, with a portion of the PIC containing the one or more laser channels.

Example 25 includes the method of any one of examples 20-24, wherein the second stiffener is sized and positioned so that a full length of at least two edges of second stiffener align with edges of the first stiffener.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a printed circuit board (PCB) having a first side and a second side opposite the first side;
    a first stiffener attached to the first side of the PCB;
    a photonic integrated circuit (PIC) attached to the first stiffener, the first stiffener between the PIC and the PCB; and
    a second stiffener attached to the second side of the PCB.

2. The apparatus of claim 1, wherein the second stiffener is in alignment with the first stiffener and the PIC.

3. The apparatus of claim 1, wherein a full length of an edge of the second stiffener is in alignment with an edge of the first stiffener in a direction normal to the first side of the PCB.

4. The apparatus of claim 1, wherein more than half of a full perimeter of the second stiffener is in alignment with a perimeter of the first stiffener in a direction normal to the first side of the PCB.

5. The apparatus of claim 1, wherein the second stiffener has a same thickness as the first stiffener.

6. The apparatus of claim 1, wherein the second stiffener is a same size as the first stiffener.

7. The apparatus of claim 1, wherein the second stiffener is smaller than the PIC.

8. The apparatus of claim 7, wherein the PIC includes one or more laser channels, the one or more laser channels circumscribed by a first area, the second stiffener larger than the first area.

9. The apparatus of claim 1, wherein the first and second stiffeners are ceramic stiffeners.

10. The apparatus of claim 1, wherein the first stiffener is attached to the PCB with a first epoxy and the PIC is attached to the first stiffener with a second epoxy, the second epoxy different than the first epoxy.

11. The apparatus of claim 10, wherein the first epoxy has a higher modulus of elasticity than the second epoxy.

12. An optical transceiver assembly comprising:
    a photonic integrated circuit (PIC);
    a first means for reducing stress in the PIC, the first stress reducing means to couple the PIC to a printed circuit board (PCB); and
    a second means for reducing stress in the PIC, the first and second stress reducing means attached to opposite sides of the PCB.

13. The optical transceiver assembly of claim 12, wherein the PIC is in stacked alignment with both the first and second stress reducing means.

14. The optical transceiver assembly of claim 12, wherein the first stress reducing means covers a first area of the PCB, and the second stress reducing means covers a second area of the PCB.

15. The optical transceiver assembly of claim 14, wherein at least a portion of a perimeter of the second area is aligned with a perimeter of the first area in a direction normal to the opposite sides of the PCB.

16. The optical transceiver assembly of claim 14, wherein the second area is smaller than the first area.

17. The optical transceiver assembly of claim 14, wherein the PIC includes one or more laser channels, and the second stress reducing means is positioned such that a perimeter of a projection of the second area onto to the PCB would completely surround a projection of the one or more laser channels.

18. The optical transceiver assembly of claim 12, wherein the second stress reducing means is attached to the PCB with a first epoxy and the PIC is attached to the first stress reducing means with a second epoxy, the second epoxy different than the first epoxy.

19. The optical transceiver assembly of claim 18, wherein the first epoxy has a higher modulus of elasticity than the second epoxy.

20. A method of assembling an optical transceiver assembly, the method comprising:
    attaching a first stiffener to a first side of a printed circuit board (PCB);
    attaching a second stiffener to a second side of the PCB, the first stiffener opposite the second stiffener; and
    attaching a photonic integrated circuit (PIC) to the first stiffener.

21. The method of claim 20, wherein the attaching of the second stiffener to the PCB occurs before the attaching of the first stiffener to the PCB.

22. The method of claim 21, wherein the attaching of the first stiffener to the PCB occurs before the attaching of the PIC to the first stiffener.

23. The method of claim 20, wherein the attaching of the first stiffener to the PCB employs a first epoxy and the attaching of the PIC to the first stiffener employs a second epoxy, the second epoxy having a lower modulus of elasticity than the first epoxy.

24. The method of claim 20, wherein the PIC includes one or more laser channels, and the method further includes positioning the second stiffener to align, in a direction normal to a mounting surface of the PCB, with a portion of the PIC containing the one or more laser channels.

25. The method of claim 20, further including positioning the second stiffener so that a full length of at least two edges of the second stiffener align with edges of the first stiffener.

* * * * *